United States Patent Office 3,106,587
Patented Oct. 8, 1963

3,106,587
2-TRIFLUOROMETHYLDI-PHENYLCARBINOL
August F. Harms, Amsterdam, Netherlands, assignor to
N. V. Koninklijke Pharmaceutische Fabrieken v/h
Brocades-Stheeman & Pharmacia, Meppel, Netherlands, a corporation of the Netherlands
No Drawing. Filed Dec. 16, 1960, Ser. No. 76,142
Claims priority, application Netherlands Dec. 17, 1959
1 Claim. (Cl. 260—618)

The present invention relates to the preparation of 2-trifluoromethyldiphenylmethane derivatives of the general formula

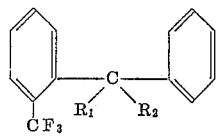

in which $R_1$ represents a hydrogen atom or a hydroxyl, $R_2$ represents a hydrogen atom or together with $R_1$ an oxygen atom.

The compounds represented by this formula are novel. They possess notwithstanding their poor solubility in the usual media, an inhibiting effect on the metabolism of brain tissue. The tissue respiration is inhibited as is apparent from the decrease in oxygen consumption during the metabolism of rat brain under aerobic conditions. The compounds according may also serve as starting products for the preparation of compounds having an activity that is even appreciably greater.

The compounds according to the invention may be prepared according to methods which are known for the preparation of similar compounds.

Thus, for example, the 2-trifluoromethyldiphenylcarbinol may be obtained by converting orthotrifluoromethylaniline into the corresponding bromide, preparing the Grignard compound from the bromide and by converting same by means of benzaldehyde into 2-trifluoromethyldiphenylcarbinol.

2-trifluoromethylbromobenzene is prepared according to Benkeser and Severson (J. Am. Chem. Soc., 73, 1353 (1951)) from the benzotrifluoride via the lithium compound.

It is also possible to have the benzaldehyde act immediately on the lithium compound of benzotrifluoride obtained.

Finally it is possible to obtain the carbinol by the reduction of 2-trifluoromethylbenzophenon with e.g. lithiumaluminumhydride (LiAlH₄). The preparation of the relative benzophenon will be described hereinafter.

Conversely the 2-trifluoromethyldiphenyl-carbinol may also serve as a starting product for the preparation of the corresponding diphenylmethane derivative by reduction e.g. with hydroiodic acid and red phosphorus or of the corresponding benzophenon, e.g. by oxidation with chromium trioxide. The 2-trifluoromethylbenzophenon may furthermore be obtained in a good yield by starting from 2-trifluoromethylbenzoic acid, converting this into an acid halide and by treating it with a phenylmagnesiumhalide or with phenyllithium. It is also possible to react the acid, if desired after converting it into an acid halide, with benzene under the influence of aluminumchloride.

A suitable method for the preparation of 2-trifluoromethyldiphenylmethane finally is the conversion according to Smith et al. (J. Am. Chem. Soc., 81, 3165/66 (1959)) of a carboxylgroup into a trifluoromethylgroup by means of sulphurtetrafluoride. In the present case 2-benzylbenzoic acid is used as a starting material for carrying out said reaction.

The invention will be elucidated with the help of the following examples:

EXAMPLE I

*Preparation of 2-Trifluoromethyldiphenylcarbinol*

*Preparation of 2-Trifluoromethylbromobenzene*

144.9 grams (0.9 mole) 2-trifluoromethylaniline are added to 528 cc. of 40% HBr (prepared from 459 cc. of 48% HBr and 69 cc. of H₂O). After cooling the mixture is diazotized with 70.4 grams (1.02 moles) of sodiumnitrite, care being taken that the temperature does not rise above 0–5° C.

After the termination of the diazotizing reaction 3 grams of copper powder are added, whereupon the temperature is allowed to rise slowly. At about 45° C. nitrogen is evolved; subsequently the temperature rises to 70° C.

The reaction mixture is subsequently subjected to a steam distillation; the organic layer is isolated, washed with lye and treated with water, sulphuric acid, water and a bicarbonate solution. The washed layer is finally dried with anhydrous calcium chloride.

Upon distillation 140 grams (69%) 2-trifluoromethylbromobenzene having a boiling point of 167–169° C. are obtained.

To 30 grams (1.25 gramatom) magnesium in 300 cc. ether 135 grams (0.6 mole) of the 2-trifluoromethylbromobenzene in 300 cc. of ether are added. After the exothermic reaction has taken place, the reaction mixture is agitated for 15 minutes, whereupon 63.6 grams (0.6 mole) of freshly distilled benzaldehyde in 150 cc. of ether are added dropwise. After a 60-minute refluxing the magnesium complex is decomposed by means of dilute hydrochloric acid; the organic layer is isolated, dried and after the ether present has been removed by distillation, it is distilled under subatmospheric pressure. The resulting product is 111 grams (73.5%) 2-trifluoromethyldiphenylcarbinol, having a boiling point of 114.5–115.5° C./2 mm. Hg.

| Analysis | C | H |
| --- | --- | --- |
| Calculated | 66.67 | 4.40 |
| Found | 66.63 | 4.63 |

EXAMPLE II

*Preparation of 2-Trifluoromethyldiphenylcarbinol*

Starting from 46.5 grams of n-butylchloride (0.5 mole) and 7 grams lithium wire (1 gramatom) in 250 cc. of ether n-butyllithium is prepared.

To the reaction-mixture 73 grams of benzofluoride (0.5 mole) are added, whereupon the mixture is refluxed for 8 hours.

After cooling the mixture freshly distilled benzaldehyde is added. A substantial evolution of heat takes place. In total 53 grams of benzaldehyde (0.5 mole) are used. After a ninety-minutes' boiling under refluxing conditions a decomposition with water is effected, whereupon the ether layer is extracted with dilute lye.

The ether layer is dried with anhydrous sodium sulphate. After concentration by evaporation a brown oil remains behind, from which a solid precipitates upon mixing said oil with methanol, which solid is separated out by filtration. The methanol-solution is concentrated by evaporation and subsequently distilled under subatmospheric pressure. 39 grams of 2-trifluoromethyldiphenylcarbinol having a boiling point of 132–136° C./4 mm. Hg are obtained.

EXAMPLE III

*Preparation of 2-Trifluoromethyldiphenylmethane*

15.12 grams (0.06 mole) of the 2-trifluoromethyldiphenylcarbinol obtained according to Example I or II are boiled under refluxing conditions for 15 hours with 5.58 grams (0.18 gramatom) of red phosphorus in 25 cc. of 57% hydroiodic acid.

After the addition of water an extraction with ether is carried out; subsequently the reaction product is washed with a sodium hydroxide-solution and a sodium thiosulphate-solution. By means of distillation 6 grams (43%) of 2-trifluoromethyldiphenylmethane having a boiling point of 85° C./3 mm. Hg are obtained.

EXAMPLE IV

*Preparation of 2-Trifluoromethylbenzophenon*

24 grams of 2-trifluoromethylbenzoic acid (0.12 mole) are refluxed together with 30 cc. of thionylchloride and 100 cc. of benzene for 12 hours.

After removing the benzene and the excess of thionylchloride by distillation 19 grams of 2-trifluoromethylbenzoylchloride having a boiling point of 96–100° C./28 mm. Hg are obtained, the yield being 76%. 35 grams of the 2-trifluoromethylbenzoyl chloride (0.17 mole) thus obtained are introduced into 100 cc. of ether. To the solution a Grignard-solution prepared from 29 grams of bromobenzene (0.19 mole) and 4.5 grams magnesium (0.19 mole) in 150 cc. of ether, is added. The reaction mixture is refluxed for another two hours whereupon it is decomposed by means of 2 N hydrochloric acid. The organic layer is isolated and, after washing it with a sodium hydroxide-solution and water, it is dried with anhydrous sodium sulphate.

After the evaporation of the ether an oil is left behind.

From said oil a fraction is obtained by a distillation under subatmospheric pressure, which fraction has a boiling point of 110–125° C./1 mm. Hg. After crystallizing said fraction from petroleum ether (boiling point 60–80° C.) 22 grams of 2-trifluoromethylbenzophenon (51%) are obtained therefrom; after being purified said compound has a melting point of 56–59° C.

| Analysis | C | H |
|---|---|---|
| Calculated | 67.21 | 3.63 |
| Found | 67.63 | 3.63 |

I claim:
2-trifluoromethyldiphenylcarbinol.

References Cited in the file of this patent

UNITED STATES PATENTS

| | | |
|---|---|---|
| 2,528,789 | Sachanen et al. | Nov. 7, 1950 |
| 2,794,813 | Farinacci | June 4, 1957 |
| 2,873,275 | Ramsden | Feb. 10, 1959 |

OTHER REFERENCES

Simons et al.: J. Am. Chem. Soc., vol. 65, pages 389–392 (1943).

Vingiello et al.: J. Am. Chem. Soc., vol. 73, 5070–72 (1951).

McGrath et al.: J. Am. Chem. Soc., vol. 77, 3634–36 (1955).